United States Patent
Ju et al.

(10) Patent No.: US 7,978,625 B2
(45) Date of Patent: Jul. 12, 2011

(54) APPARATUS AND METHOD FOR RETRANSMISSION IN WIRELESS COMMUNICATION SYSTEM

(75) Inventors: Hyeong-Jong Ju, Suwon-si (KR); Hee-Kwun Cho, Incheon (KR); Dae-Seok Choi, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 201 days.

(21) Appl. No.: 12/172,872

(22) Filed: Jul. 14, 2008

(65) Prior Publication Data
US 2009/0022063 A1 Jan. 22, 2009

(30) Foreign Application Priority Data

Jul. 18, 2007 (KR) .............................. 2007-0071489

(51) Int. Cl.
*H04L 12/26* (2006.01)
(52) U.S. Cl. ..................................... 370/252
(58) Field of Classification Search .............. 370/241, 370/252, 310, 314; 455/7–25; 714/748–751
See application file for complete search history.

(56) References Cited

U.S. PATENT DOCUMENTS

| | | | |
|---|---|---|---|
| 7,693,125 B2 * | 4/2010 | Ihm et al. ................... | 370/343 |
| 2006/0136790 A1 * | 6/2006 | Julian et al. ................. | 714/704 |
| 2007/0275657 A1 * | 11/2007 | Chang et al. ................. | 455/9 |
| 2008/0256411 A1 * | 10/2008 | Whinnett et al. ............. | 714/750 |
| 2008/0267310 A1 * | 10/2008 | Khan et al. .................. | 375/267 |
| 2009/0003257 A1 * | 1/2009 | Kumar et al. ................ | 370/314 |
| 2009/0013232 A1 * | 1/2009 | Wan et al. ................... | 714/748 |
| 2009/0022098 A1 * | 1/2009 | Novak et al. ................ | 370/329 |
| 2009/0028263 A1 * | 1/2009 | Yu et al. ..................... | 375/267 |
| 2009/0327829 A1 * | 12/2009 | Yang et al. ................... | 714/749 |
| 2010/0088568 A1 * | 4/2010 | Larsson ...................... | 714/751 |

FOREIGN PATENT DOCUMENTS

| | | | |
|---|---|---|---|
| CN | 200510059485.2 | * | 3/2005 |
| JP | 11-177536 A | | 7/1999 |
| KR | 10-2001-0023388 A | | 3/2001 |

OTHER PUBLICATIONS

Translation of Chinese Patent 200510059485.2 filed on Mar. 25, 2005 by Li Jifeng.*

* cited by examiner

*Primary Examiner* — Chi H Pham
*Assistant Examiner* — Robert Lopata
(74) *Attorney, Agent, or Firm* — Jefferson IP Law, LLP (57) ABSTRACT

An apparatus and a method for selectively retransmitting data according to a channel state in a wireless communication system are provided. The method includes determining retransmission information of a receiver from feedback information received from the receiver, determining a retransmission scheme for the receiver using the retransmission information of the receiver, and performing a retransmission process with the receiver according to the determined retransmission scheme. In a good channel state, the data is retransmitted using the retransmission scheme to thereby enhance the reliability of the data delivery and the reception performance. In a bad channel state, the data is not retransmitted to thereby reduce a waste of resources in the data retransmission.

19 Claims, 7 Drawing Sheets

APPARATUS AND METHOD FOR RETRANSMISSION IN WIRELESS COMMUNICATION SYSTEM

PRIORITY

This application claims the benefit under 35 U.S.C. §119 (a) of a Korean patent application filed in the Korean Intellectual Property Office on Jul. 18, 2007 and assigned Serial No. 2007-71489, the entire disclosure of which is hereby incorporated by reference.

BACKGROUND OF THE INVENTION

1. Field of the Invention

The present invention relates to an apparatus and a method for retransmitting data in a wireless communication system. More particularly, the present invention relates to an apparatus and a method for selectively retransmitting data according to a channel state in the wireless communication system.

2. Description of the Related Art

As a wireless communication system transmits data using radio resources, the transmitted data may be subject to an error due to a channel state. To enhance reliability of the data transmission and a reception performance, the wireless communication system retransmits the corrupted data using a retransmission scheme (e.g., Automatic Retransmission reQuest (ARQ)).

To perform the ARQ in the wireless communication system, a receiver needs to send information relating to error in the data received from a transmitter, to the transmitter. For instance, the receiver of the wireless communication system determines if there is an error in the data received from the transmitter. When the data has no error, the receiver sends an Acknowledgement (ACK) signal to the transmitter. When the data is corrupt, the receiver sends a Negative ACK (NACK) signal to the transmitter.

When receiving the ACK signal, the transmitter may transmit new data to the receiver. When receiving the NACK signal, the transmitter retransmits the original data associated with the NACK signal to the receiver.

As such, the wireless communication system can enhance the reliability of the data delivery and the reception performance using the ARQ scheme. However, when the wireless communication system adopts the ARQ scheme according to the channel state, the reception performance may be degraded, compared to the transmission without ARQ. For example, when the wireless communication system uses or does not use the ARQ scheme based on the channel condition, the reception performance changes as shown in FIGS. 1A and 1B.

Figure 1A:
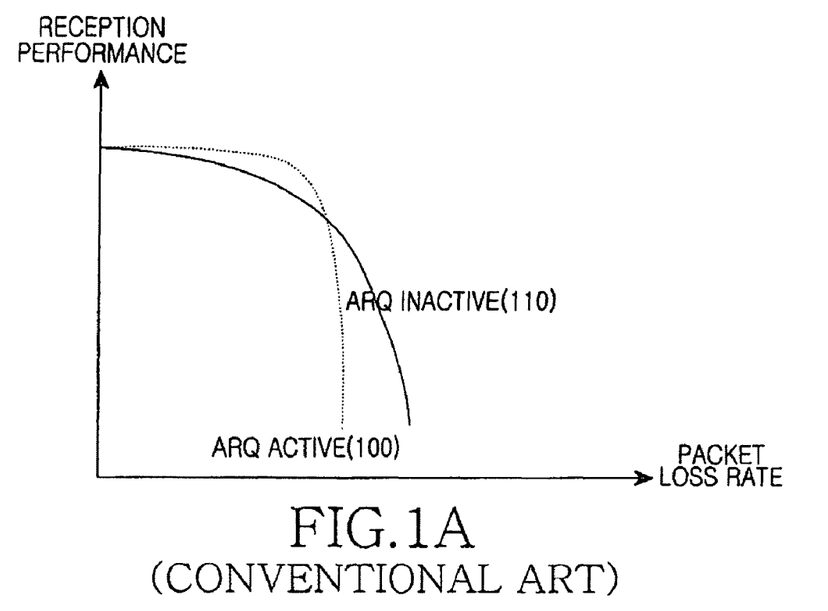
FIGS. 1A and 1B are graphs illustrating resulting changes in reception performance when using a conventional data retransmission in a wireless communication system.
Figure 1B:
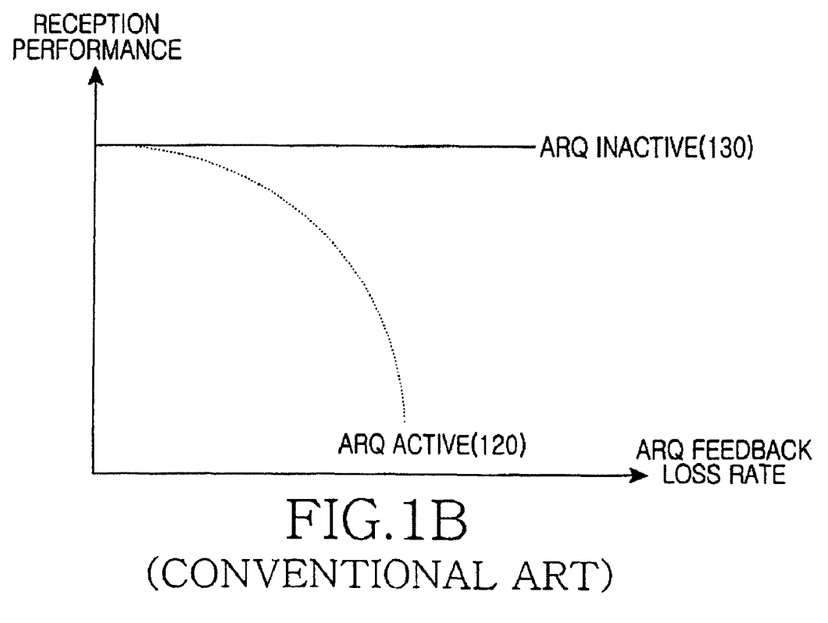

FIGS. 1A and 1B are graphs illustrating resulting changes in reception performance when using a conventional data retransmission in a wireless communication system.

FIG. 1A illustrates a resulting change in reception performance based on a packet loss rate on the assumption that there is no ARQ feedback loss in the wireless communication system, and FIG. 1B illustrates a resulting change in reception performance based on an ARQ feedback loss rate on the assumption that there is no packet loss in the wireless communication system. Herein, the packet loss rate indicates a probability of error in the data transmitted from the transmitter to the receiver, and the ARQ feedback loss rate indicates a probability of error in the ACK/NACK signal fed back from the receiver to the transmitter.

When the packet loss rate is low in FIG. 1A, the reception performance 100 with the ARQ scheme is better than the reception performance 110 without the ARQ scheme. Yet, as the packet loss rate passes beyond a certain level, the reception performance 100 with the ARQ scheme falls below the reception performance 110 without the ARQ scheme. That is, using the ARQ scheme in the wireless communication system, the reception performance is likely to degrade because the number of data retransmissions increases when the packet loss rate is beyond a certain level and the reception standby time for the NACK signal at the receiver increases.

Without the ARQ scheme in FIG. 1B, there is not a significant change of the reception performance 130 based on the ARQ feedback loss. However, when the ARQ scheme is employed and the ARQ feedback loss occurs, the transmitter does not accurately know ACK/NACK information of the data sent to the receiver. In this case, the transmitter unnecessarily retransmits the data or the receiver waits longer to receive the data for the NACK signal because the transmitter does not transmit data for the NACK signal. As a result, the reception performance 120 is degraded.

As discussed above, the wireless communication system can raise the reliability of data delivery and reception performance by retransmitting the corrupted data using the retransmission scheme. However, depending on the state of the channel environment in the wireless communication system, using the retransmission scheme can degrade performance as compared to the case on which the ARQ scheme is not used.

SUMMARY OF THE INVENTION

An aspect of the present invention is to address at least the above-mentioned problems and/or disadvantages and to provide at least the advantages described below. Accordingly, an aspect of the present invention is to provide an apparatus and a method for selectively retransmitting data according to a channel state in a wireless communication system.

Another aspect of the present invention is to provide an apparatus and a method for selectively using a retransmission scheme based on a channel state by defining a retransmission standby mode which transmits and receives only control messages for the retransmission, without retransmitting the data, in a wireless communication system.

The above aspects are addressed by providing a retransmission method of a transmitter in a wireless communication system. The method includes determining retransmission information of a receiver from feedback information received from the receiver, determining a retransmission scheme for the receiver using the retransmission information of the receiver, and performing a retransmission process with the receiver according to the determined retransmission scheme.

According to one aspect of the present invention, an apparatus for a transmitter in a wireless communication system is provided. The apparatus includes a receiver for receiving feedback information from a receiver to which data is transmitted, a scheduler for determining whether to provide a data retransmission service using channel information of the receiver obtained from the feedback information, and a retransmission controller for, when the data retransmission service is provided, determining a retransmission scheme by considering retransmission information of the receiver obtained from the feedback information and for controlling a data transmission according to the retransmission scheme.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments the present invention will become more apparent from the following detailed description taken in conjunction with the accompanying drawings, in which.

Throughout the drawings, like reference numerals will be understood to refer to like parts, components and structures.

DETAILED DESCRIPTION OF EXEMPLARY EMBODIMENTS

The following description with reference to the accompanying drawings is provided to assist in a comprehensive understanding of exemplary embodiments of the present invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Exemplary embodiments of the present invention provide a technique for selectively retransmitting data according to a channel state in a wireless communication system. Herein, it is assumed that the wireless communication adopts an Automatic Retransmission reQuest (ARQ) scheme to retransmit the data.

The wireless communication system determines whether to use the data retransmission scheme through a dynamic service addition or a dynamic service change. That is, the wireless communication system selects and uses an ARQ active mode or an ARQ inactive mode through the dynamic service addition or the dynamic service change. Herein, the ARQ active mode indicates an operational mode with the data transmission and the ARQ inactive mode indicates an operational mode without the data retransmission.

Hereinafter, descriptions are provided of a technique for selectively retransmitting data according to a channel state without a dynamic service addition or a dynamic service change in a wireless communication system. In addition to the ARQ active mode and the ARQ inactive mode, the wireless communication system defines an ARQ standby mode. Herein, the ARQ standby mode indicates a mode which transmits and receives control signals for the retransmission similar to the ARQ active mode, but does not retransmit data. The control signals for the retransmission include an Acknowledgement (ACK) signal, a Negative ACK (NACK) signal, and an ARQ reset message.

Figure 2:
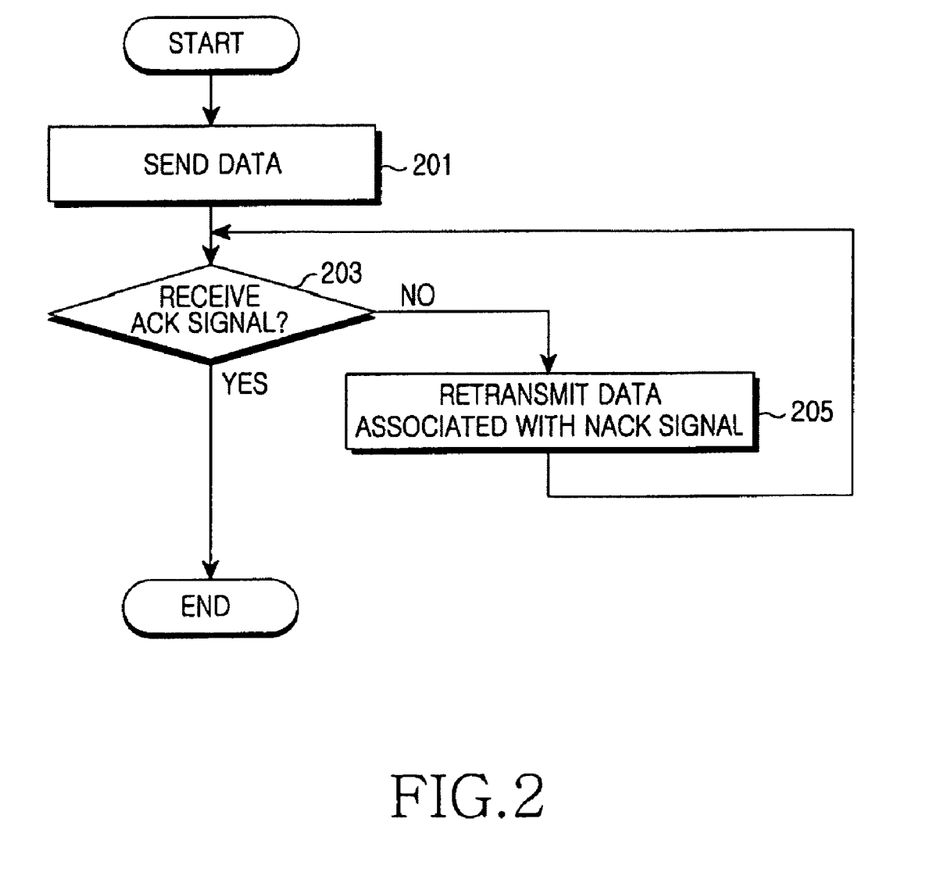
FIG. 2 is a flowchart illustrating a method for entering a retransmission active mode in a wireless communication system according to an exemplary embodiment of the present invention.

For instance, when the wireless communication system operates in the ARQ active mode, a transmitter operates as illustrated in FIG. 2.

FIG. 2 is a flowchart illustrating a method for entering a retransmission active mode in a wireless communication system according to an exemplary embodiment of the present invention.

In step 201, the transmitter sends data to a receiver using radio resources allocated through a scheduling.

In step 203, the transmitter determines whether an ACK signal is received from the receiver.

When receiving a NACK signal from the receiver, the transmitter determines there is an error with the data based on the NACK signal and retransmits the data to the receiver in step 205. Alternatively, when receiving no ACK/NACK signal from the receiver during an ACK/NACK effective time, the transmitter may determine there is an error with the data associated with the ACK/NACK signal that was not received, and retransmits the data to the receiver.

Next, the transmitter goes back to step 203 and determines whether an ACK signal for the retransmitted data is received or not. Although it is not illustrated, after the retransmission effective time lapses in the data retransmission, the transmitter discards the data without retransmitting the data.

In contrast, when receiving the ACK signal from the receiver, the transmitter determines there is no error with the data based on the ACK signal and then discards the data.

Next, the transmitter finishes this process.

Figure 3:
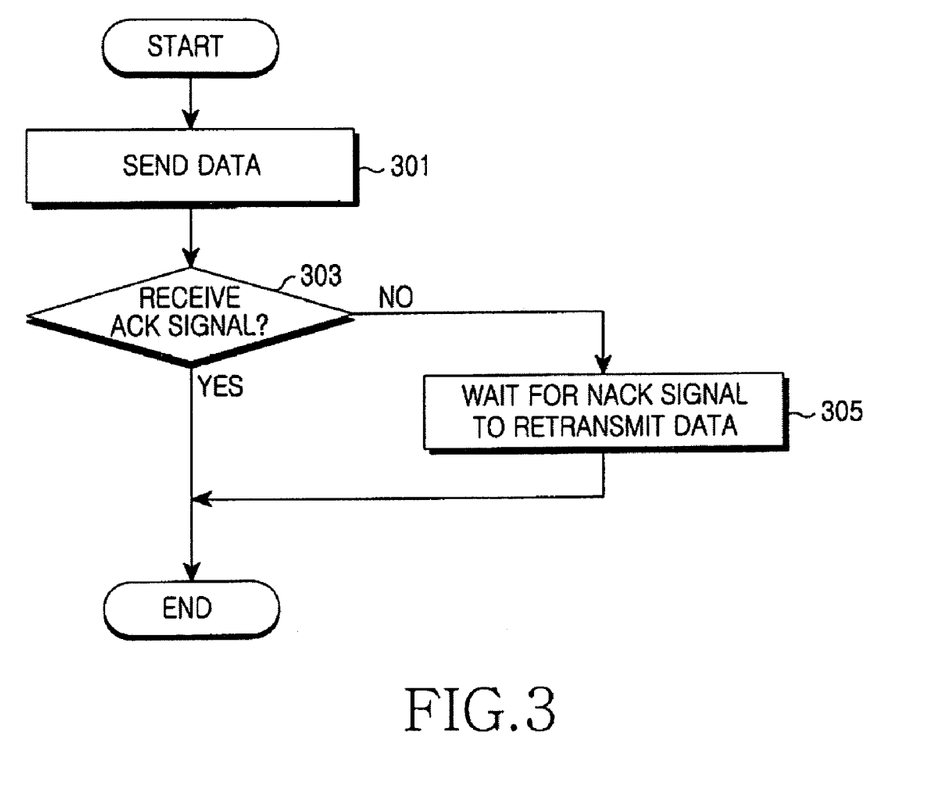
FIG. 3 is a flowchart illustrating a method for entering a retransmission standby mode in a wireless communication system according to an exemplary embodiment of the present invention.

Alternatively, when the wireless communication system operates in the ARQ standby mode, the transmitter operates as illustrated in FIG. 3.

FIG. 3 is a flowchart illustrating a method for entering the retransmission standby mode in a wireless communication system according to an exemplary embodiment of the present invention.

In step 301, the transmitter sends data to the receiver using radio resources allocated through a scheduling.

In step 303, the transmitter determines whether an ACK signal is received from the receiver.

When receiving a NACK signal from the receiver, the transmitter determines there is an error with the data based on the NACK signal and then stores retransmission information of the data in step 305. At this time, the transmitter does not retransmit the data. Alternatively, when no ACK/NACK signal is received from the receiver within an ACK/NACK effective time, the transmitter determines there is an error with the data based on the lack of ACK/NACK signal and stores the retransmission information of the data. In doing so, the transmitter does not retransmit the data.

In contrast, when receiving the ACK signal from the receiver, the transmitter determines there is no error with the data based on the ACK signal and then discards the data.

Next, the transmitter finishes this process.

As described above, in the ARQ active mode, the transmitter retransmits the data as requested by the receiver. Yet, in the ARQ standby mode, the transmitter does not retransmit the data as requested by the receiver. In the ARQ active mode and the ARQ standby mode, the receiver operates the same. For instance, when the data received from the transmitter has been corrupted, the receiver sends a NACK signal to the transmitter. When there is no error with the data, the receiver sends an ACK signal to the transmitter.

Figure 4:
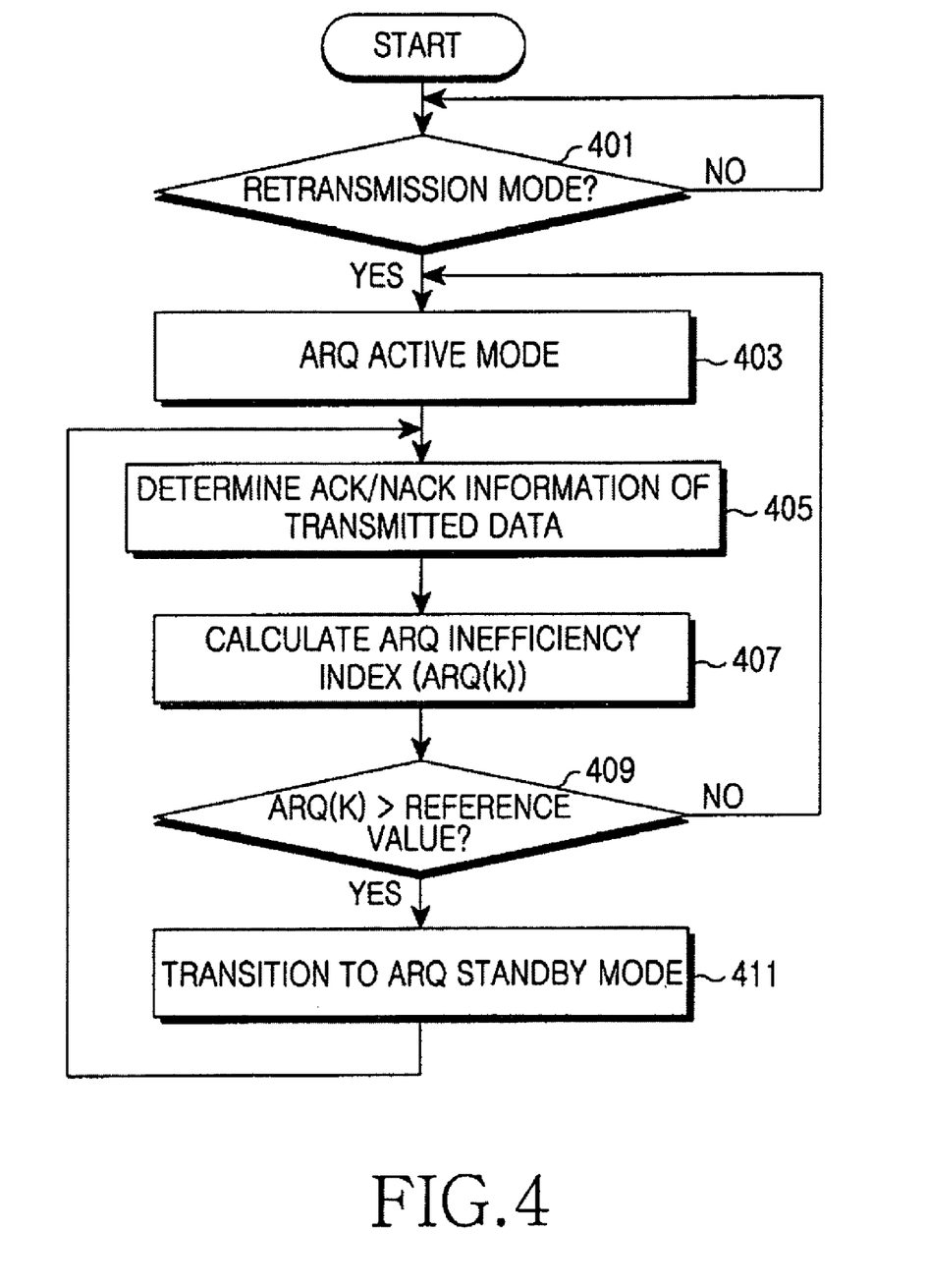
FIG. 4 is a flowchart illustrating a method for selectively using a retransmission scheme according to a channel state in a wireless communication system according to an exemplary embodiment of the present invention.

The transmitter, which is able to operate in the ARQ active mode or the ARQ standby mode, can adaptively use the ARQ active mode and the ARQ standby mode according to the channel state as illustrated in FIG. 4. Hereafter, it is assumed that the transmitter enters the ARQ active mode by default in the retransmission. Yet, when the ARQ standby mode is set by default, the transmitter may initially operate in the ARQ standby mode for the retransmission.

FIG. 4 is a flowchart illustrating a method for selectively using a retransmission scheme according to a channel state in a wireless communication system according to an exemplary embodiment of the present invention.

In step 401, the transmitter determines whether to retransmit the corrupted data through the dynamic service addition or the dynamic service change.

To retransmit the corrupted data, the transmitter enters the ARQ active mode in step 403. For example, the transmitter sends data to the receiver using the radio resources through the scheduling as shown in FIG. 2. Next, the transmitter may send new data upon receiving an ACK signal from the receiver. In contrast, when receiving a NACK signal from the receiver, the transmitter retransmits the data for the NACK signal. When not receiving the ACK/NACK signal from the receiver for a certain duration of time, the transmitter retransmits data to the receiver, of which the ACK/NACK signal is not received.

In step 405, the transmitter determines retransmission information of the data sent to the receiver. Herein, the retransmission information includes the number of ARQ blocks responded to by the receiver with an ACK, the number of ARQ blocks responded to by the receiver with a NACK, and the number of ARQ blocks for which the receiver does not send a ACK/NACK signal within the ACK/NACK effective time in the data sent by the transmitter within a certain duration of time.

In step 407, the transmitter calculates an ARQ inefficiency index in relation with the receiver. Herein, the transmitter calculates the ARQ inefficiency index based on Equation 1.

$$ARQII(k) = E\left[w_1 \times f\left(\frac{y}{(x+y)}\right) + w_2 \times f(Z)\right] \quad (1)$$

In Equation 1, ARQII(k) denotes the ARQ inefficiency index, x denotes the number of the ARQ blocks responded to by the receiver with ACK, y denotes the number of the ARQ blocks responded to by the receiver with NACK, and Z denotes the number of the ARQ blocks for which the transmitter does not receive a ACK/NACK signal within the ACK/NACK effective time. $w_1$ and $w_2$ denote weights according to the channel conditions of the wireless communication system, and $f(\bullet)$ denotes a function which adaptively applies the calculation of x, y and Z depending on the channel conditions of the wireless communication system.

The ARQ inefficiency index acquired based on Equation 1 is proportional to the number of the ARQ blocks responded to with the NACK and the number of the ARQ blocks for which the transmitter does not receive the ACK/NACK signal within the ACK/NACK effective time. As the channel state of the wireless communication system deteriorates, the number of the ARQ blocks responded to with the NACK and the number of the ARQ blocks for which the transmitter does not receive the ACK/NACK signal within the ACK/NACK effective time increases. Accordingly, the worse the channel state of the wireless communication system, the greater the ARQ inefficiency index in Equation 1.

In step 409, the transmitter compares the ARQ inefficiency index with a reference value to selectively use the ARQ active mode and the ARQ standby mode according to the channel state.

When the ARQ inefficiency index is smaller than or equal to the reference value (ARQII(k)≦reference value), the transmitter determines that there is a good channel state with respect to the receiver. Thus, the transmitter enters the ARQ active mode in step 403. That is, when the channel state is good according to the ARQ inefficiency index, the packet loss rate and the ARQ feedback loss rate decrease and accordingly the transmitter enters the ARQ active mode.

In contrast, when the ARQ inefficiency index is greater than the reference value (ARQII(k)>reference value), the transmitter determines that there is a bad channel state with respect to the receiver. Thus, the transmitter enters the ARQ standby mode in step 411. That is, when the channel state is bad according to the ARQ inefficiency index, the packet loss rate and the ARQ feedback loss rate increase and accordingly the transmitter enters the ARQ standby mode.

For example, when entering the ARQ standby mode, the transmitter operates as shown in FIG. 3. In more detail, the transmitter sends data to the receiver using radio resources allocated through scheduling. After the ACK signal is received from the receiver, the transmitter sends new data. In contrast, after the NACK signal is received from the receiver, the transmitter merely stores retransmission information of the data without retransmitting the data in response to the NACK signal. When no ACK/NACK signal is received from the receiver within the ACK/NACK effective time, the transmitter merely stores retransmission information of the data without retransmitting the data for which no ACK/NACK signal is received from the receiver.

In the ARQ standby mode, the transmitter does not retransmit the data. Yet, when the channel state changes for the better, the transmitter transmits and receives control signals for the retransmission to and from the receiver to transition to the ARQ active mode.

Next, the transmitter goes back to step 405 and determines retransmission information of the data sent to the receiver.

As such, the wireless communication system can selectively retransmit data using the ARQ inefficiency index indicative of the channel state, without using the dynamic service addition or the dynamic service change. When determining the bad channel state based on the ARQ inefficiency index in the ARQ active mode, the transmitter changes to the ARQ standby mode. When determining the good channel state based on the ARQ inefficiency index in the ARQ standby mode, the transmitter transitions to the ARQ active mode. In doing so, the reference value for the transmitter to change from the ARQ active mode to the ARQ standby mode may be the same as or different from the reference value for changing from the ARQ standby mode to the ARQ active mode.

In the ARQ standby mode, the receiver of the wireless communication system transmits control signals to the transmitter for the retransmission. If the receiver sends the NACK signal, the transmitter does not retransmit data in response to the NACK signal. However, since the receiver waits to receive the data in response to the NACK signal within the retransmission effective time, the reception standby of the receiver for the data in response to the NACK signal wastes resources.

To reduce the waste of the resources in the reception standby of the receiver for the data in response to the NACK signal, the transmitter periodically sends an ARQ reset message to the receiver. Upon receiving the ARQ reset message, the receiver initializes the ARQ operation in process and discards Service Data Units (SDUs) not completely assembled.

Figure 7:
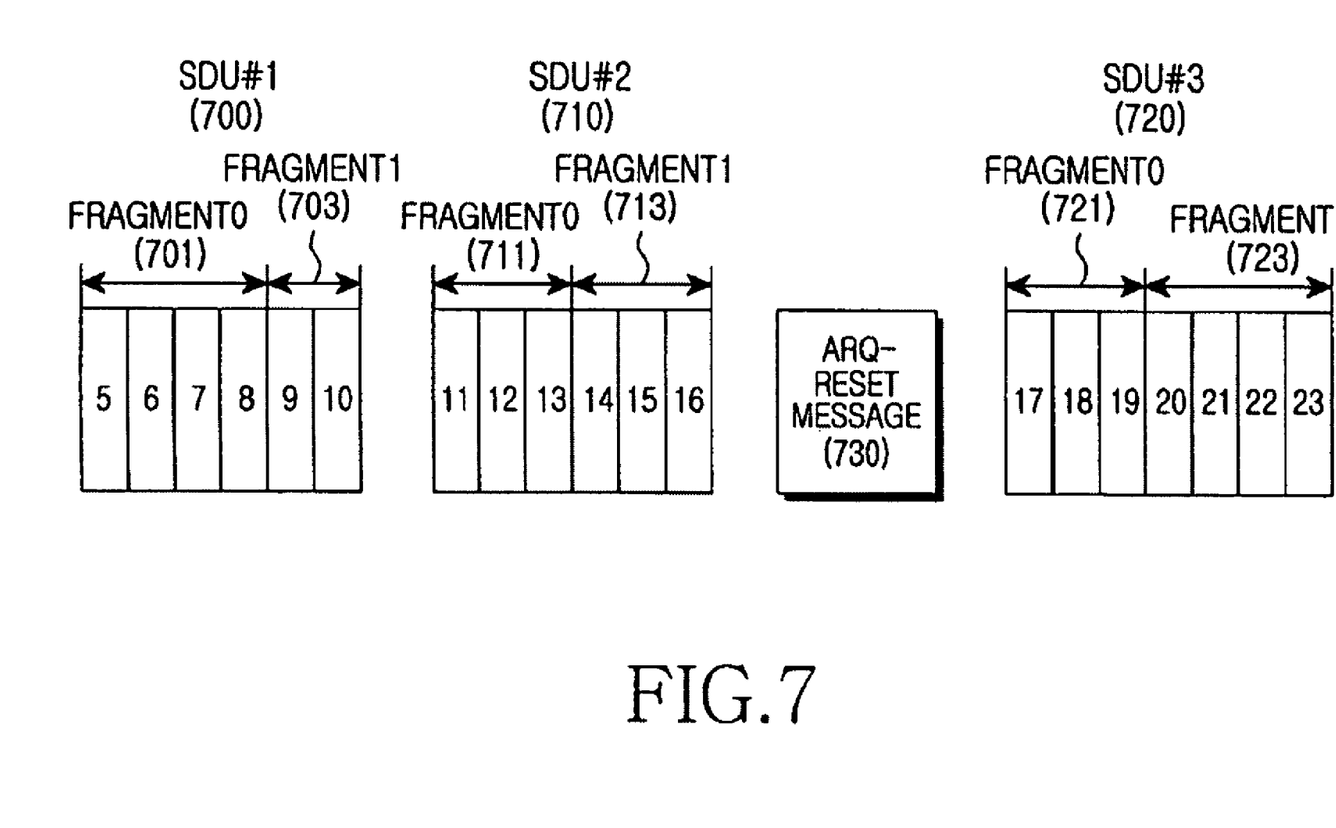
FIG. 7 is a diagram illustrating a structure for carrying data from the transmitter in the retransmission standby mode in a wireless communication system according to an exemplary embodiment of the present invention.

To reduce the amount of discarded SDUs not completely assembled in the receiver according to the ARQ reset message, the transmitter sends the ARQ reset message between the SDUs as illustrated in FIG. 7.

FIG. 7 is a diagram illustrating a structure for carrying data from the transmitter in the retransmission standby mode in a wireless communication system according to an exemplary embodiment of the present invention.

The SDU transmitted from the transmitter includes a plurality of ARQ blocks as illustrated in FIG. 7. For example, SDU#1 700 includes six ARQ blocks. The transmitter can divide the SDU#1 700 into multiple ARQ block fragments if necessary and transmit the fragmented SDU 190 1 700 to the receiver. That is, the transmitter can send the SDU#1 700 to the receiver by dividing the SDU#1 700 into two fragments; this is, a fragment0 701 and a fragment1 703. Similar to SDU#1 700, SDU#2 710 includes a fragment0 711 and a fragment1 713, and SDU#3 720 includes a fragment0 721 and a fragment1 723.

The transmitter constitutes a Protocol Data Unit (PDU) with the ARQ block fragments of the SDUs 700, 710 and 720. If the transmitter sends the ARQ reset message 730 in between the ARQ block fragments of one SDU, the receiver discards the ARQ block fragments according to the ARQ reset message even when there is no error with the ARQ block fragments of the received SDU. For instance, when the transmitter sends the ARQ reset message between the fragment0 701 and the fragment1 703 of the SDU#1 700, the receiver receives the ARQ reset message after the fragment1 701. Since the SDU#1 700 is not completely constituted, the receiver discards the fragment0 701 regardless of error with the fragment0 701.

Thus, the transmitter sends the ARQ reset message 730 in between the SDUs to reduce the loss of the SDU successfully received at the receiver without error.

Now, the structure of the transmitter for selectively retransmitting data according to the channel state in the wireless communication system is explained. While the wireless communication system is assumed to adopt a Time Division Duplex (TDD) scheme, the present invention is applicable to other communication schemes such as Frequency Division Duplex (FDD) scheme and the like.

Figure 5:
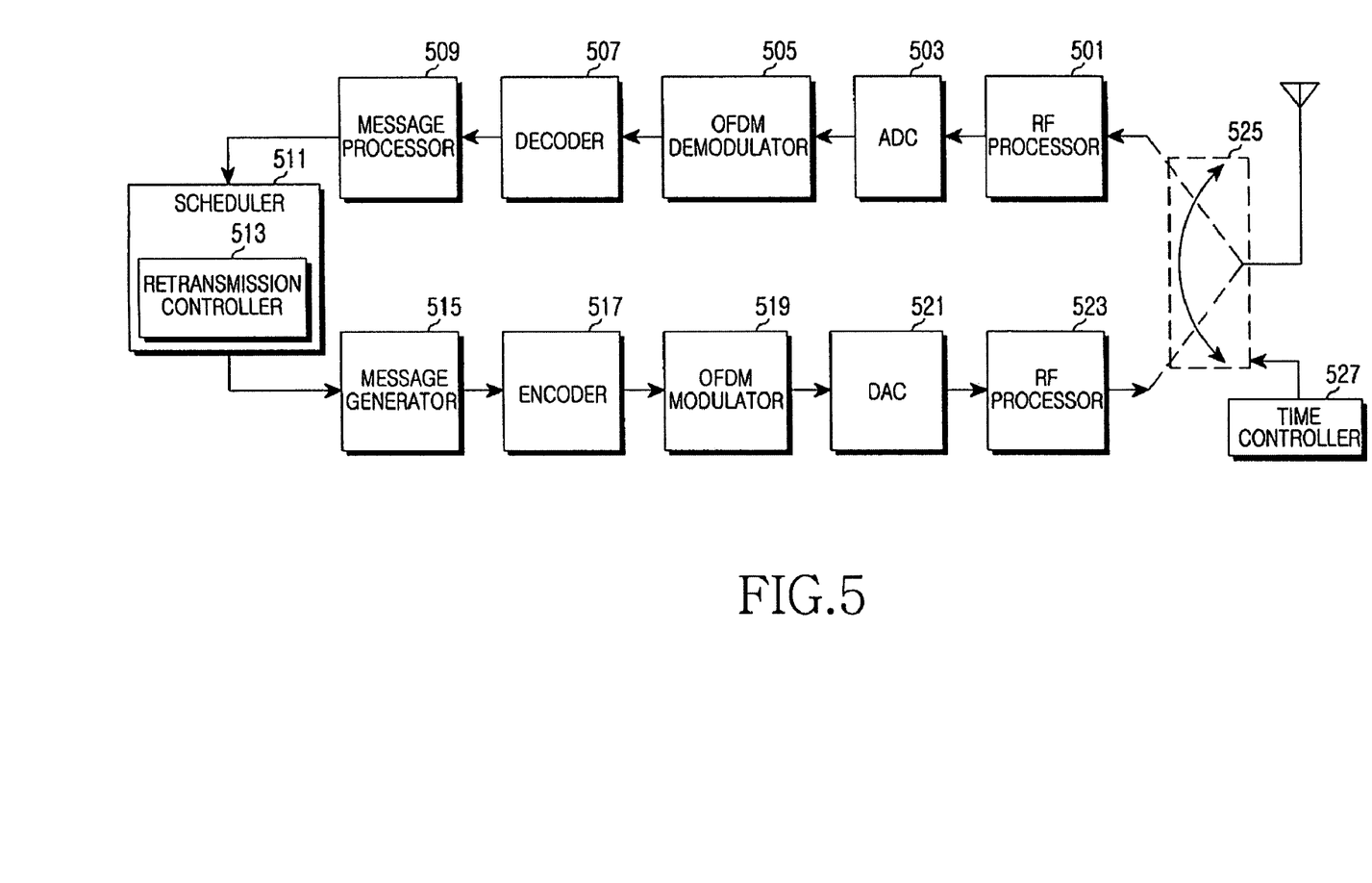
FIG. 5 is a block diagram of a transmitter in a wireless communication system according to an exemplary embodiment of the present invention.

FIG. 5 is a block diagram of the transmitter in a wireless communication system according to an exemplary embodiment of the present invention.

The transmitter of FIG. 5 includes a Radio Frequency (RF) processor 501, an Analog/Digital Converter (ADC) 503, an Orthogonal Frequency Division Multiplexing (OFDM) demodulator 505, a decoder 507, a message processor 509, a scheduler 511, a retransmission controller 513, a message generator 515, an encoder 517, an OFDM modulator 519, a Digital/Analog Converter (DAC) 521, an RF processor 523, a switch 525, and a time controller 527.

The time controller 527 controls a switching operation of the switch 525 based on a frame synchronization. For example, in a signal reception interval, the time controller 527 controls the switch 525 to connect an antenna to the RF processor 501 of the receiving stage. In a signal transmission interval, the time controller 527 controls the switch 525 to connect the antenna to the RF processor 523 of the transmitting stage.

In the reception interval, the RF processor 501 converts an RF signal received over the antenna into a baseband analog signal. The ADC 503 converts the analog signal output from the RF processor 501 into a digital signal. The OFDM demodulator 505 converts the time-domain signal output from the ADC 503 into a frequency-domain signal through a Fast Fourier Transform (FFT).

The decoder 507 selects data of subcarriers to be actually received from the frequency-domain data output from the OFDM demodulator 505, and demodulates and decodes the selected data at a preset modulation level (Modulation and Coding Scheme (MCS) level).

The message processor 509 decomposes the control signal output from the decoder 507 and provides the result to the scheduler 511. For example, the message processor 509 determines the feedback information received from the receivers and provides the information to the scheduler 511. Herein, the feedback information includes channel information (e.g., Signal to Interference and Noise Ratio (SINR)), ACK signal information, NACK signal information and the like.

The scheduler 511 schedules services to the receivers based on the channel information of the receivers provided from the message processor 509. Next, the scheduler 511 generates data to be sent to the receivers according to information of resources allocated to the receivers to be serviced through the scheduling.

The scheduler 511 determines whether to use the retransmission scheme according to the channel information of the receivers. Using the retransmission scheme, the scheduler 511 controls the retransmission controller 513 to selectively retransmit data based on the channel state.

The retransmission controller 513 controls to operate in the ARQ active mode when the channel state is good according to the ACK/NACK signal information provided from the message processor 509, and controls to operate in the ARQ standby mode when the channel state is poor.

The message generator 515 generates a message including the resource allocation information output from the scheduler 511. In the ARQ standby mode under the control of the retransmission controller 513, the message generator 515 periodically generates and outputs the ARQ reset message. Herein, the message generator 515 generates the ARQ reset message to transmit it in between the SDUs.

The encoder 517 encodes and modulates the data sent to the receivers at the preset modulation level (MCS level) based on the message output from the message generator 515 and the scheduling information.

The OFDM modulator 519 converts the frequency-domain signal output from the encoder 517 to a time-domain sample signal through an Inverse FFT (IFFT).

The DAC 521 converts the sample signal output from the OFDM modulator 519 into an analog signal.

The RF processor 523 converts the baseband signal output from the DAC 521 into an RF signal and transmits the RF signal via the antenna.

Figure 6:
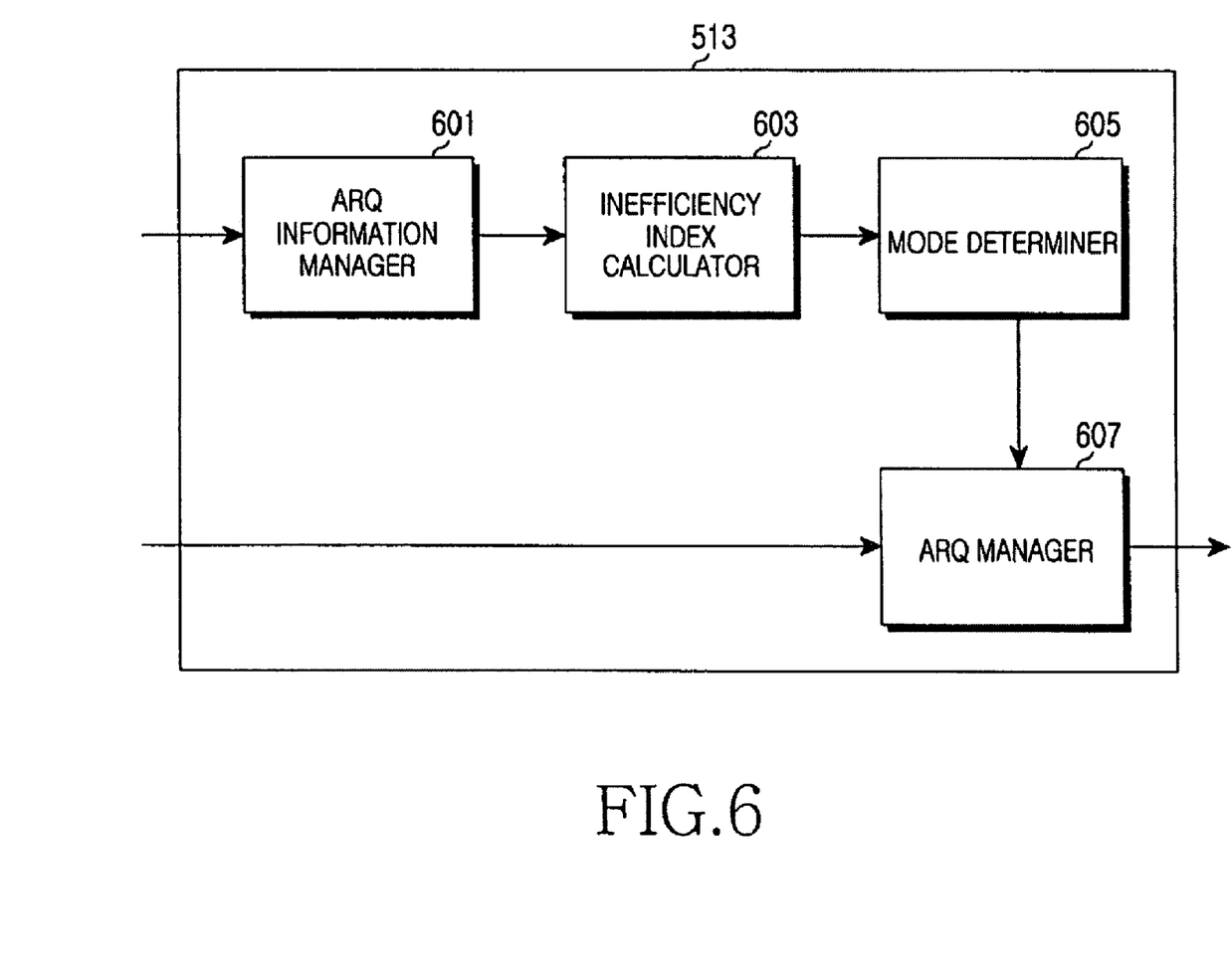
FIG. 6 is a detailed block diagram of a retransmission controller of the transmitter in a wireless communication system according to an exemplary embodiment of the present invention.

In the transmitter constructed as above, the retransmission controller 513 can be constituted as illustrated in FIG. 6.

FIG. 6 is a detailed block diagram of the retransmission controller 513 of the transmitter in a wireless communication system according to an exemplary embodiment of the present invention.

The retransmission controller 513 of FIG. 6 includes an ARQ information manager 601, an inefficiency index calculator 603, a mode determiner 605, and an ARQ manager 607.

When the scheduler 511 determines to use the retransmission scheme, the ARQ information manager 601 determines the retransmission information according to the ACK/NACK information fed from the message processor 509. More specifically, the ARQ information manager 601 determines the number of the ARQ blocks for the ACK signal, the number of the ARQ blocks for the NACK signal, and the number of the ARQ blocks for which the transmitter does not receive the ACK/NACK signal within the ACK/NACK effective time.

The inefficiency index calculator 603 calculates the inefficiency index using the retransmission information provided from the ARQ information manager 602. For example, the inefficiency index calculator 603 calculates the inefficiency index based on Equation 1.

The mode determiner 605 determines the retransmission mode according to the inefficiency index output from the inefficiency index calculator 603. For instance, when the inefficiency index is greater than the reference value, the mode determiner 605 determines the channel state to be bad and selects the ARQ standby mode as the retransmission mode.

When the inefficiency index is less than or equal to the reference value, the mode determiner 605 determines the channel state to be good and selects the ARQ active mode as the retransmission mode.

The ARQ manager 607 controls the data retransmission according to the retransmission mode determined at the mode determiner 605. For instance, when the mode determiner 605 selects the ARQ active mode, the ARQ manager 607 retransmits the data to the receiver in response to the NACK signal received from the receiver. When the mode determiner 605 selects the ARQ active mode and no ACK/NACK signal is received from the receiver within the ACK/NACK effective time, the ARQ manager 607 retransmits the data associated with the ACK/NACK signal that was not received, to the receiver.

In the ARQ active mode, the ARQ manager 607 determines the retransmission effective time. After the retransmission effective time lapses, the ARQ manager 607 finishes the retransmission of the corresponding data.

When the mode determiner 605 selects the ARQ standby mode, the ARQ manager 607 does not retransmit the data even after receiving the NACK signal from the receiver or after not receiving the ACK/NACK signal from the receiver within the ACK/NACK effective time.

In the ARQ standby mode, the ARQ manager 607 controls the message generator 515 to periodically send the ARQ reset message to reduce a waste of resources in the retransmission standby time of the receiver. To reduce the loss of the SDUs of the receiver, the ARQ manager 607 controls the message generator 515 to send the ARQ reset message in between the SDUs.

As set forth above, the data is selectively retransmitted based on the channel state in the wireless communication system. In a good channel state, the data is retransmitted using the retransmission scheme to thus enhance the reliability of the data delivery and increase reception performance. In a bad channel state, the data is not retransmitted at all to thereby reduce a waste of resources in the data retransmission.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A retransmission method of a transmitter in a wireless communication system, the method comprising:
   determining retransmission information of a receiver from feedback information received from the receiver;
   calculating an inefficiency index for the retransmission using the retransmission information;
   determining a retransmission scheme for the receiver using the calculated inefficiency index; and
   performing a retransmission process with the receiver according to the determined retransmission scheme.

2. The method of claim 1, wherein the retransmission information comprises at least one of a number of data relating to an Acknowledgement (ACK) signal for data sent to the receiver, a number of data relating to a Negative ACK (NACK) signal for data sent to the receiver, a number of data for which an ACK/NACK signal is not received within an ACK/NACK reception effective time, and a Signal to Interference and Noise Ratio (SINR) with respect to the receiver.

3. The method of claim 1, wherein the determining of the retransmission scheme comprises:
   selecting one of a first retransmission scheme which retransmits data according to a retransmission request of the receiver, and a second retransmission scheme which does not retransmit data even upon receiving a retransmission request of the receiver, based on the inefficiency index.

4. The method of claim 3, wherein the inefficiency index is calculated based on the following equation:

$$ARQII(k) = E\left[w_1 \times f\left(\frac{y}{(x+y)}\right) + w_2 \times f(Z)\right]$$

where ARQII(k) denotes an inefficiency index of the retransmission, x denotes a number of data blocks for an ACK signal, y denotes a number of data blocks for a NACK signal, Z denotes a number of data blocks for which an ACK/NACK signal is not received within an ACK/NACK reception effective time, and $w_1$ and $w_2$ denote weights based on channel conditions of the wireless communication system.

5. The method of claim 1, wherein the performing of the retransmission process comprises:
   when selecting a retransmission scheme which retransmits data according to a retransmission request of the receiver, transmitting data to the receiver; and
   when receiving a NACK signal from the receiver, retransmitting the data to the receiver in response to the NACK signal.

6. The method of claim 5, wherein the performing of the retransmission process further comprises:
   when no ACK/NACK signal is received with respect to the data sent to the receiver within an ACK/NACK reception effective time, retransmitting the data associated with the ACK/NACK signal that is not received, to the receiver.

7. The method of claim 5, wherein the performing of the retransmission process further comprises:
   when receiving an ACK signal from the receiver, discarding the data in response to the ACK signal.

8. The method of claim 1, wherein the performing of the retransmission process further comprises:

when selecting a retransmission scheme which does not retransmit data upon receiving a retransmission request of the receiver, transmitting data to the receiver; and when receiving a NACK signal from the receiver, not retransmitting the data in response to the NACK signal.

9. The method of claim 8, wherein the performing of the retransmission process further comprises:

when no ACK/NACK signal is received with respect to the data sent to the receiver within an ACK/NACK reception effective time, not retransmitting the data associated with the ACK/NACK signal that is not received, to the receiver.

10. The method of claim 8, wherein the performing of the retransmission process further comprises:

when receiving an ACK signal from the receiver, discarding the data in response to the ACK signal.

11. The method of claim 8, wherein the performing of the retransmission process further comprises:

periodically transmitting a signal which initializes the data retransmission, to the receiver.

12. An apparatus for a transmitter in a wireless communication system, the apparatus comprising:

a receiver for receiving feedback information from a receiver to which data is transmitted;

a scheduler for determining whether to provide a data retransmission service using channel information of the receiver obtained from the feedback information; and a retransmission controller for, when the data retransmission service is provided, calculating an inefficiency index for the retransmission using the retransmission information, and for determining a retransmission scheme for the receiver using the calculated inefficiency index, and for controlling a data retransmission according to the retransmission scheme.

13. The apparatus of claim 12, wherein the retransmission controller comprises:

a retransmission information manager for managing retransmission information of the receiver;

an inefficiency index calculator for calculating the inefficiency index of the retransmission using the retransmission information;

a mode determiner for determining the retransmission scheme based on the inefficiency index; and a retransmission manager for controlling a data retransmission according to the retransmission scheme.

14. The apparatus of claim 13, wherein the retransmission information manager manages the retransmission information which comprises at least one of a number of data relating to an Acknowledgement (ACK) signal for data sent to the receiver, a number of data relating to a Negative ACK (NACK) signal for data sent to the receiver, a number of data for which an ACK/NACK signal is not received within an ACK/NACK reception effective time, and a Signal to Interference and Noise Ratio (SINR) with respect to the receiver.

15. The apparatus of claim 13, wherein the inefficiency index calculator calculates the inefficiency index based on the following equation:

$$ARQII(k) = E\left[w_1 \times f\left(\frac{y}{(x+y)}\right) + w_2 \times f(Z)\right]$$

where ARQII(k) denotes an inefficiency index of the retransmission, x denotes a number of data blocks for an ACK signal, y denotes a number of data blocks for a NACK signal, Z denotes a number of data blocks for which an ACK/NACK signal is not received within an ACK/NACK reception effective time, and $w_1$ and $w_2$ denote weights based on channel conditions of the wireless communication system.

16. The apparatus of claim 13, wherein the mode determiner selects one of a first retransmission scheme which retransmits data according to a retransmission request of the receiver, and a second retransmission scheme which does not retransmit data even upon receiving a retransmission request of the receiver, based on the inefficiency index.

17. The apparatus of claim 13, wherein, when the mode determiner selects a retransmission scheme which retransmits data according to a retransmission request of the receiver and an NACK signal is received from the receiver or no ACK/NACK signal is received from the receiver within an ACK/NACK reception effective time with respect to the data sent to the receiver, the retransmission manager controls to retransmit the data associated with the received NACK signal or associated with the ACK/NACK signal that is not received, to the receiver.

18. The apparatus of claim 13, wherein, when the mode determiner selects a retransmission scheme which does not retransmit data upon a retransmission request of the receiver and an NACK signal is received from the receiver or no ACK/NACK signal is received from the receiver within an ACK/NACK reception effective time with respect to the data sent to the receiver, the retransmission manager controls not to retransmit the data associated with the received NACK signal or associated with the ACK/NACK signal that is not received, to the receiver.

19. The apparatus of claim 13, wherein, when the mode determiner selects a retransmission scheme which does not retransmit data upon a retransmission request of the receiver, the retransmission manager controls to periodically transmit a signal which initializes the data retransmission, to the receiver.

* * * * *